US006776554B2

(12) United States Patent
Acciacca

(10) Patent No.: US 6,776,554 B2
(45) Date of Patent: Aug. 17, 2004

(54) CABLE ATTACHMENT AND METHOD OF ASSEMBLING SAME

(75) Inventor: Allan Charles Acciacca, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 25 days.

(21) Appl. No.: 10/033,113

(22) Filed: Oct. 25, 2001

(65) Prior Publication Data

US 2003/0081995 A1 May 1, 2003

(51) Int. Cl.[7] .................................................. F16C 1/10

(52) U.S. Cl. ........................ 403/353; 292/225; 74/502.6

(58) Field of Search ................................ 403/202, 203, 403/220, 225, 229, 286, 287, 291, 353; 74/502.4, 502.6; 24/120 R, 128; 292/125, 133, 225, 235

(56) References Cited

U.S. PATENT DOCUMENTS 1,921,777 A * 8/1933 Ridgers
2,032,567 A * 3/1936 Fiege .................... 24/122.6 X
2,291,649 A * 8/1942 Roberts
2,511,283 A * 6/1950 McGovern
2,854,857 A * 10/1958 Gleasman et al. ..... 74/502.6 X
3,066,371 A * 12/1962 Mullens .................. 403/353 X
3,100,323 A * 8/1963 Baker .......................... 403/353
3,399,605 A * 9/1968 Landers et al. ......... 403/353 X
3,542,408 A * 11/1970 Lowrey .................. 403/353 X
4,185,863 A * 1/1980 Larson et al. ........... 403/353 X
4,266,439 A * 5/1981 Hayashi et al. ............ 74/502.4
4,364,284 A * 12/1982 Tani et al. ............. 74/502.6 X
4,452,360 A * 6/1984 Barnes ................... 403/353 X
4,533,276 A * 8/1985 Stidham
4,847,973 A * 7/1989 Lundeen ................ 74/502.4 X
4,850,084 A * 7/1989 Iwasaki .................. 403/353 X
4,876,948 A * 10/1989 Yasukawa et al. ..... 74/502.6 X
5,142,935 A * 9/1992 Carr .......................... 74/502.6
5,246,303 A * 9/1993 Trilla et al. ................. 403/353
5,431,256 A * 7/1995 Wen ...................... 74/502.4 X
5,662,369 A * 9/1997 Tsuge
5,671,639 A * 9/1997 Wagner et al. ............. 74/502.6
5,816,109 A * 10/1998 Dege ......................... 74/502.4
5,927,895 A * 7/1999 Watanabe ................... 403/353
6,076,868 A 6/2000 Roger, Jr. et al.
6,135,514 A 10/2000 Kowalewski et al.
6,280,241 B2 8/2001 Herlinger et al.
6,318,207 B1 * 11/2001 Asai et al. ................ 74/502.6
6,422,763 B1 7/2002 Halbach et al.
6,474,190 B1 * 11/2002 Choo ........................ 74/502.4

* cited by examiner

*Primary Examiner*—Lynne H. Browne
*Assistant Examiner*—Ryan M Flandro
(74) *Attorney, Agent, or Firm*—Scott A. McBain

(57) ABSTRACT

A vehicle has a storage compartment latch that includes a moveable detent member and a release actuator for moving the detent member to a release position that is operated from inside the storage compartment. The release actuator has a handle that pulls a cable to move the detent member. The cable is attached to the detent member by a cable attachment that comprises a retention slot in an end portion of the detent member and an end length of the cable that has a ferrule attached to it. The end length of the cable is loaded into the retention slot in a transverse manner via a loading slot and transition slots in the end portion of the detent member.

10 Claims, 3 Drawing Sheets

CABLE ATTACHMENT AND METHOD OF ASSEMBLING SAME

FIELD OF THE INVENTION

This invention relates to a cable attachment and to a method of assembling the cable attachment.

BACKGROUND OF THE INVENTION

U.S. Pat. No. 6,135,514 granted to Thomas Joseph Kowalewski et al Oct. 24, 2000 discloses an automotive vehicle release mechanism for a storage compartment latch. The latch has a pivotally mounted fork bolt and a pivotally mounted detent member that holds the fork bolt in an engaged position. The detent member is pivoted away from the fork bolt to release the fork bolt and allow the compartment lid to be opened. The detent member is normally pivoted by an internal cam that is operated by a key lock cylinder accessible from the compartment exterior. However, the detent member can also be pivoted by pulling a cable inside the storage compartment that is attached to the detent member. The cable is attached to the detent member by a pin on an arm of the detent member that extends through a slot of a ring shaped link that is attached to the end of the cable. This provides a lost motion connection so that the detent member can be pivoted by the internal cam without disturbing the cable.

SUMMARY OF THE INVENTION

This invention provides a lost motion cable attachment that is simple, efficient and easy to assemble.

The cable attachment of the invention comprises an end portion of a member and a end length of cable that has a ferrule attached to it. The member has an open ended loading slot that extends into the end portion of the member to an inner end forming separate cantilevered fingers on opposite sides of the loading slot. The loading slot spans the separate fingers to form openings between the fingers at opposite sides of the end portion. The end portion of the member also has a retaining slot that is transverse to the loading slot with the loading slot having an inner end portion and the retaining slot having an outer end portion that overlaps the inner end portion of the loading slot. The end portion of the member further includes a first transition slot that extends from one of the opposite sides of the end portion through one of the fingers into the inner end portion of the loading slot and the overlapping outer end portion of the retaining slot and a second transition slot that extends from another of the opposite sides of the end portion through another of the fingers into the inner end portion of the loading slot and the overlapping outer end portion of the retaining slot. The end length of cable extends through the retaining slot so that the ferrule is engageable with a surface of the end portion adjacent the retaining slot for moving the member. The end length of the cable being moveable axially in the retaining slot forms a lost motion attachment with the end portion of the member.

The end length of cable is loaded into the retaining slot by inserting the end length of cable transversely through the loading slot to the transition slots, then rotating the end length in planar fashion into the transition slots and then inserting the end length of cable transversely into the retaining slot.

The retaining slot may be linear with the transition slots inhibiting escape of the cable transversely from the retaining slot. However, the retaining slot is preferably shaped to further inhibit escape of the cable transverse to its axis. For example, the outer end portion and the inner end portion of the retaining slot can be linear while the intermediate portion is curved to inhibit movement of the cable transversely in the retaining slot from the linear inner end portion to the linear outer end portion.

DESCRIPTION OF PREFERRED EMBODIMENT

Figure 1:
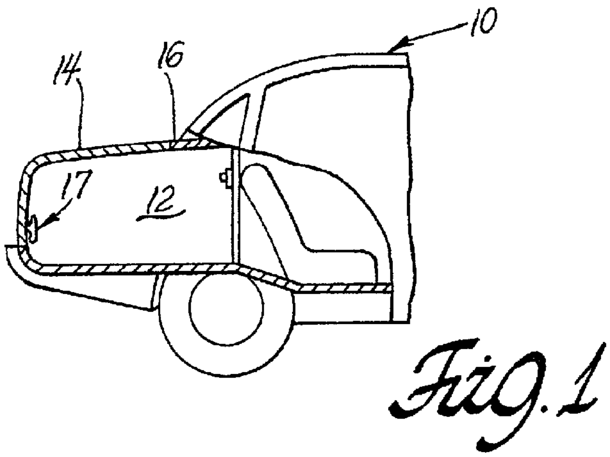
FIG. 1 is a side elevation view, partly in section, of the rear portion of an automobile, showing the rear trunk storage compartment, a lid for opening and closing the compartment, and a compartment latch having a release mechanism that includes a cable attachment of the invention.

Referring now more particularly to the drawings, FIG. 1 illustrates a vehicle 10 having a trunk storage compartment 12 closed by a lid 14. Lid 14 pivots at 16 between the closed position shown in FIG. 1 and an open position (not shown). The lid is held closed by a compartment latch 17 that is attached to the inside of lid 14.

The compartment latch 17 includes a fork bolt 18 that pivots on pin 20 that is attached to a frame 22. Frame 22 is mounted on the inside surface of lid 14. Fork bolt 18 pivots on pin 20 between a latched position shown in FIG. 2 and an unlatched position shown in FIG. 3. Fork bolt 18 cooperates with a striker 24 secured to the body 26 of the vehicle to hold lid 14 closed.

Fork bolt 18 has a generally C-shaped portion 28 defined by two spaced apart legs 30 and 32 with a slot 34 between the legs. When fork bolt 18 is in the latched position of FIG. 2, the C-shaped portion 28 grips striker 24 in slot 34 holding lid 14 in the closed position shown in FIG. 2. When the fork bolt 18 is released, it is pivoted to the unlatched position of FIG. 3 as the lid 14 is opened and striker 24 withdraws from the C-shaped portion 28.

Figure 2:
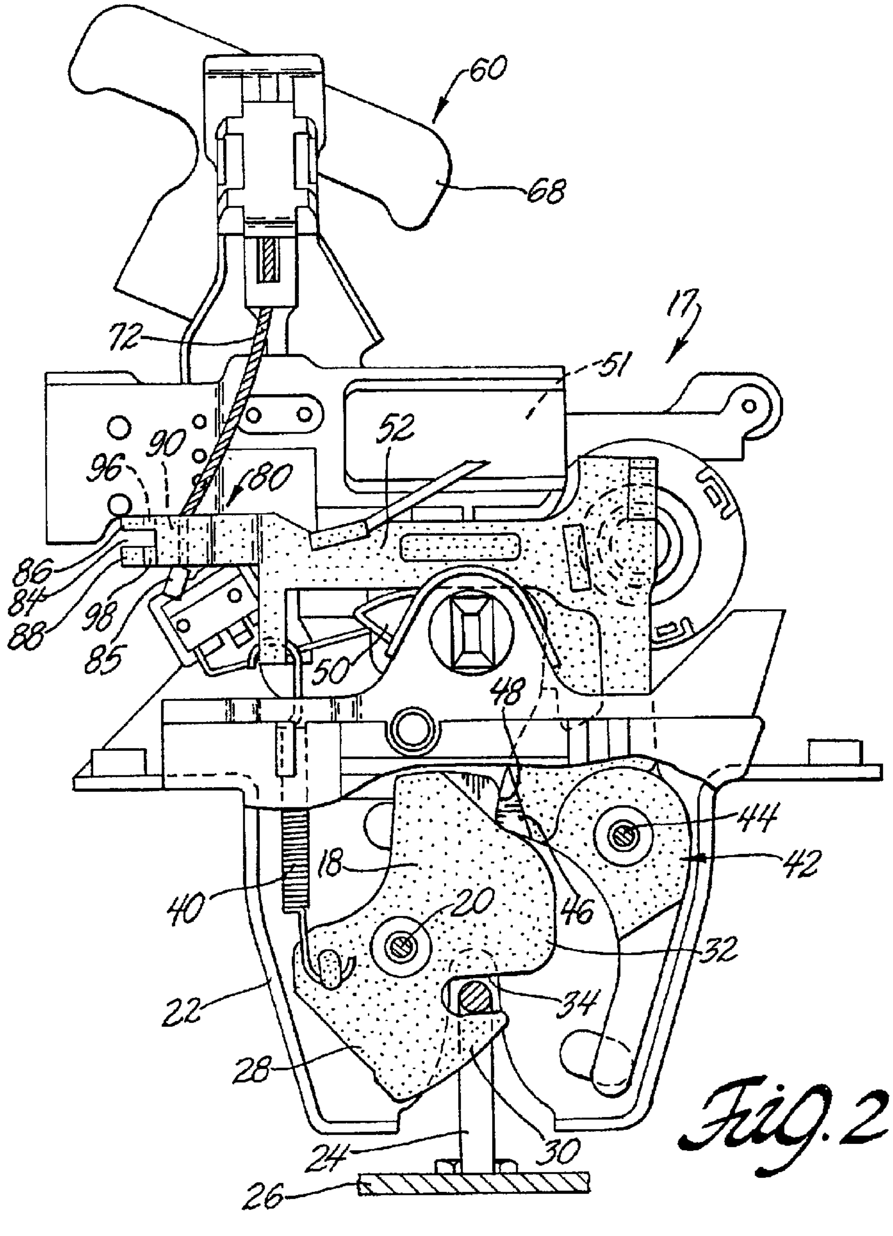
FIG. 2 is an enlarged partially sectioned front view of the compartment latch in the latched condition.
Figure 3:
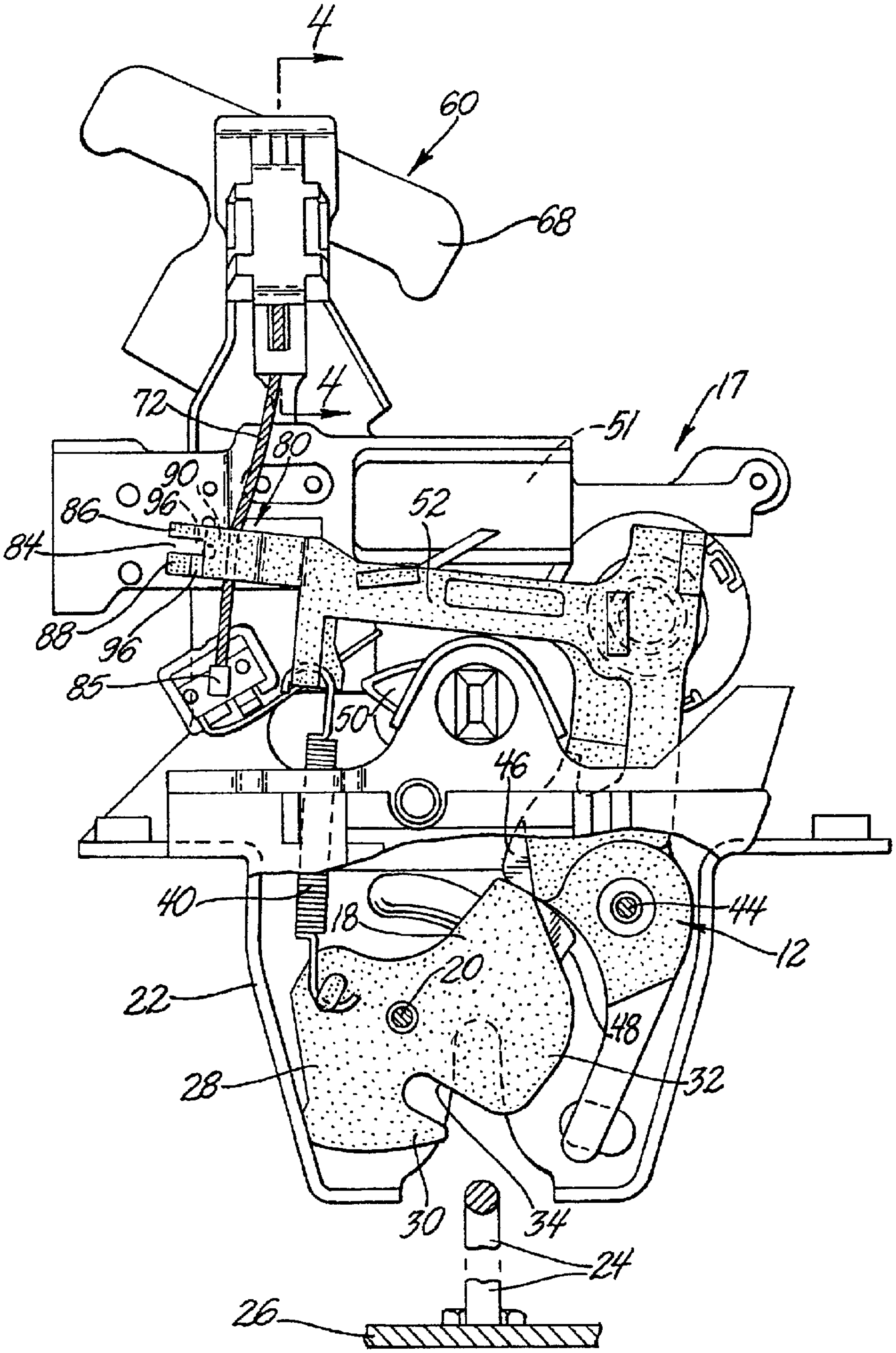
FIG. 3 is an enlarged partially sectioned front view of the compartment latch in the unlatched condition.

The fork bolt 18 is urged clockwise about the pin 20 to the unlatched position of FIG. 3 by a coil spring 40 that has one end attached to fork bolt 18 and a opposite end attached to a detent member 42. Detent member 42 pivots about pin 44 and urged counterclockwise to the fork bolt retaining position of FIG. 2 by the coil spring 40. Detent member 42 has a catch 46 that engages a shoulder 48 of fork bolt 18 to retain the fork bolt 18 in the latched position when detent member 42 is in the fork bolt retaining position of FIG. 2. When detent member 42 is pivoted to the release position of FIG. 3, the fork bolt 18 is free to rotate to the unlatched position of FIG. 3. Fork bolt 18 is pivoted to the unlatched position of FIG. 3 by coil spring 40 as lid 14 is lifted and striker 24 exits slot 34.

Detent member 42 is normally pivoted to the release position by an internal cam 50 that engages an arm 52 of the detent member 42. To move detent member 42 to the release position of FIG. 3, cam 50 is rotated clockwise by a conventional key lock cylinder (not shown) that is attached to the compartment lid 14. The key lock cylinder is attached so that the key lock cylinder can be operated from the exterior of the storage compartment 12 by a key. Latch 17 also includes a power option whereby cam 50 is rotated by an electric motor 51 that is controlled by a passenger compartment switch or a key fob. Latch 17 also includes provision for remote operation by a push-pull cable (not shown) that is operated from the passenger compartment and attached to arm 52 of detent 42 by spaced integral attachment eyes 54. Details of the power operation or the remote operation of compartment latch 17 are not needed to understand the invention and consequently the power and remote mechanical operations are not explained in detail.

Figure 4:
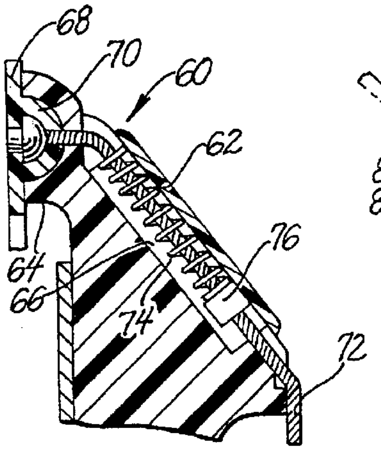
FIG. 4 is a section view taken substantially along the line 4—4 of FIG. 3 looking in the direction of the arrows.

Detent member 42 can also be pivoted to the release position by a release actuator 60 that is located inside storage compartment 12. Release actuator 60 comprises a housing 62 that is integrally attached to compartment latch 17. Housing 62 has a ball socket 64 at one end and a cable passage 66 that leads from the ball socket 64 through housing 62 to an exit at an opposite end of the housing as best shown in FIG. 4. Release actuator 60 has a T-shaped release handle 68 with a ball portion 70 that is seated in ball socket 64. A cable 72 is attached to handle 68 at one end, then passes through cable passage 66 and then proceeds to arm 52 of detent member 42 where cable 72 is attached to arm 52 in accordance with the invention as described below.

Release actuator 60 also includes a coil spring 74 in cable passage 66 surrounding a portion of cable 72. Coil spring 74 abuts an internal shoulder near the back of ball socket 64 at one end and a ferrule 76 at the other end that is crimped or otherwise attached to the cable 72. Coil spring 74 biases ball portion 70 of release handle 68 against ball socket 64.

Figure 5:
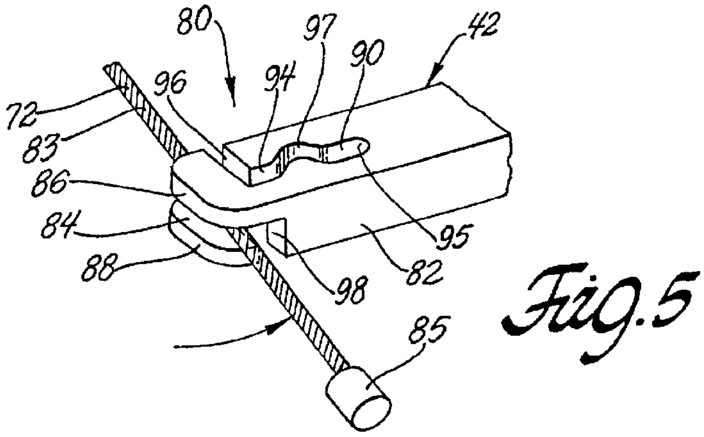
FIG. 5 is a perspective view of the cable attachment of the invention showing an early assembly step.
Figure 6:
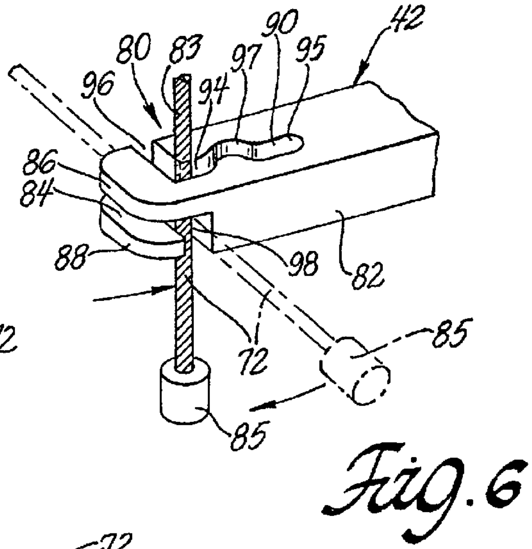
FIG. 6 is a perspective view of the cable attachment showing an intermediate assembly step.
Figure 7:
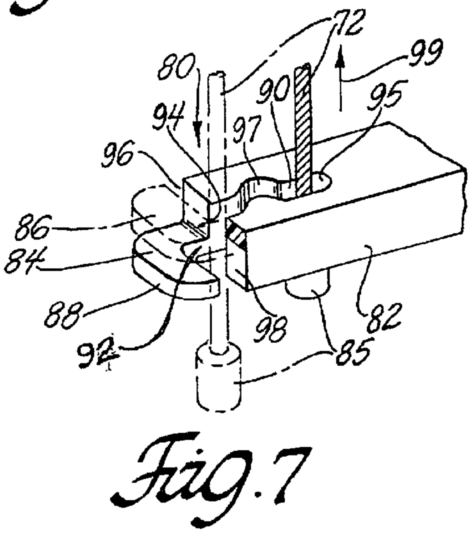
FIG. 7 is a perspective view of the cable attachment showing a final assembly step.

Cable 72 is connected to arm 52 of detent member 42 by the cable attachment of the invention that is indicated generally at 80 and illustrated in FIGS. 5, 6 and 7. Cable attachment 80 comprises an end portion 82 of detent member 42, an end length 83 of cable 72, and a ferrule 85 that is attached to the end of cable 72. As part of cable attachment 80, detent member 42 has an open ended loading slot 84 that extends into the end portion 82 to an inner end forming separate cantilevered fingers 86 and 88 on opposite sides of loading slot 84. Loading slot 84 spans the separate fingers 86 and 88 to form openings between the fingers at opposite sides of the end portion 82 of detent member 42.

The end portion 82 of detent member 42 also has a retaining slot 90 that is at least transverse, but preferably perpendicular to loading slot 84. Loading slot 84 has an inner end portion 92 while retaining slot 90 has an outer end portion 94 that overlaps the inner end portion 92 of loading slot 84 as best shown in FIG. 7. The end portion 82 of detent member 42 also has two aligned transition slots 96 and 98 that are preferably perpendicular to the loading slot 84 and to the retaining slot 90. Transition slot 96 extends from one side of end portion 82 (the far side as viewed in FIGS. 5, 6 and 7) through finger 86 into the inner end portion 92 of loading slot 84 and the overlapping outer end portion 94 of retaining slot 90. Transition slot 98 on the other hand extends from the opposite side of the end portion 82 (the near side as viewed in FIGS. 5, 6 and 7) through the finger 88 into the inner end portion 92 and the overlapping outer end portion 94.

The end length 83 of cable 72 is loaded into the retaining slot 84 through loading slot 84 and transition slots 96 and 98 as explained below so that cable 72 extends through retaining slot 84. Cable 72 moves axially in retaining slot so that ferrule 85 engages a surface of the end portion 82 of detent member 42 adjacent retaining slot 90 to move detent member 42.

Cable 72 being moveable axially in retaining slot 90 together with end portion 82 of moveable detent member 42 forms the lost motion cable attachment 80 of the invention which does not interfere with the normal operation of compartment latch as demonstrated by comparing FIG. 2 to FIG. 3. This comparison shows that cable 72 simply slides in retaining slot 90 of the end portion 82 as detent member 42 is moved from the fork bolt retaining position of FIG. 2 to the release position of FIG. 3. On the other hand, lost motion cable attachment 80 is capable of moving detent member 42 to the release position of FIG. 3 by pulling handle 68 away from seat 64 when detent member 42 is in the fork bolt retaining position of FIG. 2 because ferrule 85 engages the bottom surface of end portion 82 and pulls up as indicated by arrow 99 in FIG. 7 thereby moving detent member 42 to the release position of FIG. 3.

Cable 72 is inhibited from escaping transversely from retaining slot 90 by transition slots 96 and 98 which require rotation of a length of cable 72 is a planar fashion in order to pass from retaining slot 90 back out to loading slot 84. However, retaining slot 90 itself is preferably shaped to further inhibit escape of cable 72. One such shape is shown in FIGS. 5, 6 and 7 where the outer end portion 94 of retaining slot 90 is linear and the retaining slot 90 has an aligned linear inner end portion 95 and a curved intermediate portion 97. The curved intermediate portion 97 inhibits movement of cable 72 transversely in the retaining slot 90 between end portions 94 and 95 by eliminating a straight shot from end portion 95 to end portion 94 thus requiring cable 72 to jog around the curved intermediate portion 97. When retaining slot 90 is shaped to inhibit escape of cable 72, of course, the cable 72 is disposed in the linear inner end portion 95 of retaining slot 90. Other shapes to inhibit escape of cable 72 are also possible.

Cable attachment 80 is assembled by the following method. An initial step is to provide a member that has a properly shaped end, such as the end portion 82 of member 42 that has an open ended loading slot 84 that extends into the end portion of the member to an inner end forming separate cantilevered fingers 86 and 88 on opposite sides of the loading slot 84, the loading slot 84 spanning the separate fingers to form openings between the fingers at opposite sides of the end portion, a retaining slot 90 that is transverse to the loading slot 84, the loading slot having an inner end portion 92 and the retaining slot 90 having an outer end portion 94 that overlaps the inner end portion of the loading slot, a first transition slot 96 that extends from one of the opposite sides of the end portion through one of the fingers 86 into the inner end portion of the loading slot and the overlapping outer end portion of the retaining slot, and a second transition slot 88 that extends from another of the opposite sides of the end portion through another of the fingers into the inner end portion of the loading slot and the overlapping outer end portion of the retaining slot.

Another initial step is to provide a cable having ferrule attached to it such as cable 72 with ferrule 85. An end length of 83 of cable 72 is then inserted transversely into the open ended loading slot 84 in the end portion 82 of member 42 until the end length of cable is disposed in the inner end portion 92 of loading slot 84 as shown in FIG. 5.

The end length 83 of cable 72 is then rotated in a planar fashion through the transition slots 96 and 98 until the end length of cable 72 is aligned with the retaining slot 90 as shown in FIG. 6. The end length of cable 72 is then inserted into the retaining slot 90 so that cable 72 is deep into the retaining slot 90 and moveable axially in the retaining slot 90. When retaining slot is shaped to inhibit escape of cable 72 as shown in FIG. 7, the length of cable 72 is inserted into the retaining slot 90 past curved intermediate portion 97 and into the inner end portion 95 of the retaining slot.

Figure 8:
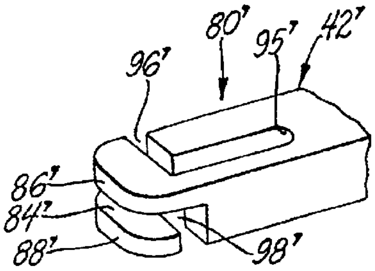
FIG. 8 is a perspective view of an alternate cable attachment of the invention.

FIG. 8 shows an alternate arrangement wherein the retaining slot is linear and designated as 90' and the modified cable attachment is designated as 80'. Cable attachment 80' is otherwise the same as cable attachment 80 and corresponding parts are identified with primed numerals corresponding to the unprimed numerals of the first embodiment.

While the cable attachment has been illustrated in connection with a compartment latch, the cable attachment may be used in any application that requires or desires a lost motion cable connection. In other words, many modifications and variations of the present invention in light of the above teachings may be made. It is, therefore, to be understood that, within the scope of the appended claims, the invention may be practiced otherwise than as specifically described.

I claim:

1. A cable attachment for attaching a cable to an end portion of a member comprising:

the member having an open ended loading slot that extends completely across and into the end portion of the member to an inner end forming separate cantilevered fingers extending across the member on opposite sides of the loading slot, the loading slot spanning the separate fingers to form openings between the fingers at opposite sides of the end portion, the end portion of the member having a retaining slot that is transverse to the loading slot, the loading slot having an inner end portion and the retaining slot having an open end that communicates with the inner end portion of the loading slot and a closed end that is remote from the inner end portion of the loading slot, the end portion of the member having a first transition slot that extends from one of the opposite sides of the end portion of the member through one of the fingers into the inner end portion of the loading slot and to the open end of the retaining slot, the end portion of the member having a second transition slot that extends from another of the opposite sides of the end portion of the member through another of the fingers into the inner end portion of the loading slot and to the open end of the retaining slot, and the cable extending through the retaining slot and having a ferrule that engages a surface of the end portion of the member adjacent the retaining slot for moving the member, the cable being moveable axially in the retaining slot to form a lost motion attachment with the end portion of the member.

2. The cable attachment as defined in claim 1 wherein the cable is loaded into the retaining slot through the loading slot and the first and the second transition slots.

3. The cable attachment as defined in claim 1 wherein the second transition slot is coplanar with the first transition slot.

4. The cable attachment as defined in claim 1 wherein the retaining slot is linear.

5. The cable attachment as defined in claim 1 wherein the retaining slot is shaped to inhibit escape of the cable transverse to the axis of the cable.

6. A cable attachment for attaching a cable to an end portion of a member comprising:

the member having an open ended loading slot that extends completely across and into the end portion of the member to an inner end forming separate cantilevered fingers extending across the member on opposite sides of the loading slot, the loading slot spanning the separate fingers to form openings between the fingers at opposite sides of the end portion, the end portion of the member having a retaining slot that is transverse to the loading slot, the loading slot having an inner end portion and the retaining slot having an open end that communicates with the inner end portion of the loading slot and a closed end that is remote from the inner end portion of the loading slot, the end portion of the member having a first transition slot that extends from one of the opposite sides of the end portion of the member through one of the fingers into the inner end portion of the loading slot and to the open end of the retaining slot, the end portion of the member having a second transition slot that extends from another of the opposite sides of the end portion of the member through another of the fingers into the inner end portion of the loading slot and to the open end of the retaining slot, and the cable extending through the retaining slot and having a ferrule that engages a surface of the end portion of the member adjacent the retaining slot for moving the member, the cable being moveable axially in the retaining slot to form a lost motion attachment with the end portion of the member, wherein, the retaining slot is shaped to inhibit escape of the cable transverse to the axis of the cable, the retaining slot having a linear portion adjacent the open end, a linear portion adjacent the closed end, and a curved intermediate portion that inhibits movement of the cable transversely in the retaining slot between the closed end and the open end.

7. The cable attachment as defined in claim 6 wherein the cable is disposed in the linear portion of the retaining slot that is adjacent the closed end.

8. A cable attachment for attaching a cable to an end portion of a moveable member comprising:

the member having an open ended loading slot that extends completely across and into the end portion of the member to an inner end forming separate cantilevered fingers extending across the member on opposite sides of the loading slot, the loading slot spanning the separate fingers to form openings between the fingers at opposite sides of the end portion, the end portion of the member having a retaining slot that is perpendicular to the loading slot, the loading slot having an inner end portion and the retaining slot having an open end portion that communicates with the inner end portion of the loading slot and a closed end that is remote from the inner end portion of the loading slot, the end portion of the member having a first transition slot that extends from one of the opposite sides of the end portion of the member through one of the fingers into the inner end portion of the loading slot and to the open end of the retaining slot, the end portion of the member having a second transition slot that extends from another of the opposite sides of the end portion of the member through another of the fingers into the inner end portion of the loading slot and to the open end of the retaining slot, and the cable extending through the retaining slot and having a ferrule that engages a surface of the end portion of the member adjacent the retaining slot for moving the member, the cable being moveable axially in the retaining slot to form a lost motion attachment with the end portion of the moveable member.

9. A method of assembling a cable attachment comprising the steps of:

providing a member having an open ended loading slot that extends completely across and into the end portion of the member to an inner end forming separate cantilevered fingers extending across the member on opposite sides of the loading slot, the loading slot spanning the separate fingers to form openings between the fingers at opposite sides of the end portion, a retaining slot that is transverse to the loading slot, the loading slot having an inner end portion and the retaining slot having an open end that communicates with the inner end portion of the loading slot and a closed end that is remote from the inner end portion of the loading slot, a first transition slot that extends from one of the opposite sides of the end portion of the member through one of the fingers into the inner end portion of the loading slot and to the open end of the retaining slot, and a second transition slot that extends from another of the opposite sides of the end portion of the member through another of the fingers into the inner end portion of the loading slot and to the open end of the retaining slot, providing a cable having a ferrule attached to it, inserting an end length of the cable transversely into the loading slot until the cable is disposed in the inner end portion of the loading slot, rotating the end length of the cable in a planar fashion through the first and the second transition slots until the length of the cable is aligned with the open end of the retaining slot, and inserting the end length of the cable into the retaining slot so that the cable is moveable axially in the retaining slot and the ferrule is engagable with a surface of the member adjacent the retaining slot.

10. The method as defined in claim 9 wherein the retaining slot has a linear portion adjacent the open end, a linear portion adjacent the closed end, and a curved intermediate portion that inhibits movement of the cable transversely in the retaining slot between the closed end and the open end, and wherein the end length of the cable is inserted into the retaining slot until it is disposed in the inner end portion of the retaining slot.

* * * * *